March 24, 1970 A. F. PODELL 3,503,016

LOW FREQUENCY HYBRID CIRCUIT HAVING UNBALANCED PARTS

Filed Aug. 28, 1968 2 Sheets-Sheet 1

INVENTOR.
Allen F. Podell

BY
Kenway, Jenney & Hildreth
ATTORNEYS

March 24, 1970 A. F. PODELL 3,503,016

LOW FREQUENCY HYBRID CIRCUIT HAVING UNBALANCED PARTS

Filed Aug. 28, 1968 2 Sheets-Sheet 2

INVENTOR.
Allen F. Podell

BY
Kenway Jenney & Hildreth
ATTORNEYS

United States Patent Office 3,503,016
Patented Mar. 24, 1970

3,503,016
LOW FREQUENCY HYBRID CIRCUIT HAVING UNBALANCED PARTS

Allen F. Podel, Cambridge, Mass., assignor to Adams-Russell Co., Inc., Waltham, Mass., a corporation of Massachusetts Filed Aug. 28, 1968, Ser. No. 755,958
Int. Cl. H03h 7/48
U.S. Cl. 333—11 2 Claims

ABSTRACT OF THE DISCLOSURE

A bridge type, four port hybrid circuit comprising two transformers, each having a primary winding, one having two secondary windings, and one having three secondary windings, the windings being interconnected to form four ports, each of which is unbalanced with respect to ground.

My invention relates to an improved construction particularly useful for low frequency hybrid circuits. More particularly, it relates to an improved construction for low frequency hybrids of the bridge type in which there are four hybrid ports, each unbalanced; i.e., one terminal of each of the four ports is grounded.

Hybrid circuits for radio frequency signals are devices which are characterized generally as having four sets of electrical terminals or "ports." These ports are arranged in two pairs. A high frequency (i.e., radio frequency) signal applied as an input signal to one of a first pair of ports will divide equally in power and appear at each of the other pair of ports but will not appear at the other port of the first pair which includes the excited port. This relationship generally holds true for all four ports. A general description of the properties of hybrid junctions as well as some early examples of them may be found on pages 825 to 834 of Reinjtes and Coate, "Principles of Radar" (3d edition) published in 1952 by the McGraw Hill Book Company.

Hybrid junctions have undergone substantial developments since those illustrated in the early reference described above. A hybrid junction employing transmission in line transformers in what might be termed a "bridge" configuration is illustrated and described in U.S. Patent No. 3,317,849 to Smith-Vaniz. The hybrid circuit described in the Smith-Vaniz patent utilizes four transmission line transformers whose windings have first ends interconnected in a bridge configuration. The other ends of the windings on the transmission line transformers are connected together in two parallel pairs. Four ports are formed, one across each parallel pair, and one across each diagonal of the bridge.

Hybrid circuits of the type described in the Smith-Vaniz patent are quite satisfactory for relatively high frequency operation; i.e., in the range of 100 to 1,000 megacycles and even higher.

For low frequency operation, a variation of the circuit shown in the Smith-Vaniz patent utilizing only two transformers has been developed. FIGURE 1*a* shows such a bridge configuration utilizing conventional transformers. FIGURE 1*b* shows the actual circuit which can be developed from FIGURE 1*a* and which will be described more completely below. This low frequency hybrid, which is useful in the range from about 50 kilocycles to 50 megacycles, is quite satisfactory in that range of operation and is relatively easy to manufacture. However, it does have one significant disadvantage. This disadvantage is that all of the ports do not appear "unbalanced." Three of the four ports may be inherently connected to ground because of the arrangement of the transformers, but one of the four ports appears between the ends of two windings of one of the transformers which inherently may not be grounded.

When it is desired to have a low frequency hybrid having all ports unbalanced, i.e., one terminal of each of the four ports being connected to ground, in the past it has been the practice to use a "balun" to connect the unbalanced port to a grounded and an ungrounded terminal. However, the balun adds substantially to the cost of the device and in addition introduces losses.

I have found that a low frequency hybrid circuit of the type described may be provided using only two transformers by providing an additional secondary winding on one of the two transformers used to form the hybrid. This secondary winding is connected to one of the diagonal terminals of the bridge. The other end of this winding is connected to one terminal of a second set, and the other terminal of this second set is grounded. The second set of terminals forms a grounded port. Thus, it is possible to provide a low frequency bridge type hybrid circuit using only two transformers. Since two transformers are used, only two cores are provided. Thus, there is substantially no loss by reason of an additional core, as would be required if a "balun" were used. Thus, my invention provides a two-core, low frequency bridge type hybrid circuit with all ports unbalanced.

Accordingly, it is the principal object of my invention to provide an improved low frequency hybrid circuit of the bridge type. Another object of my invention is to provide a circuit of the type described in which all four ports are unbalanced without introducing an additional ferrite core. A further object of my invention is to provide a circuit of the type described which is of lower cost as compared to those heretofore available. Other objects of my invention will in part by obvious and will in part appear hereinafter.

The invention accordingly comprising the features of construction, combination of elements and arrangement of parts which will be exemplified in the construction hereinafter set forth, and the scope of the invention will be indicated in the claims.

For a fuller understanding of the nature and objects of my invention, reference should be had to the following detailed description taken in connection with the accompanying drawings.

In the drawings,

FIGURE 1*a* is a schematic circuit diagram of a bridge type hybrid circuit for low frequency application using four separate transformers.

FIGURE 1*b* illustrates how the circuit of FIGURE 1*a* may be constructed using only two transformers, each of the transformers having two secondary windings.

Both FIGURES 1*a* and 1*b* are exemplary of the prior art.

Figure 1A:
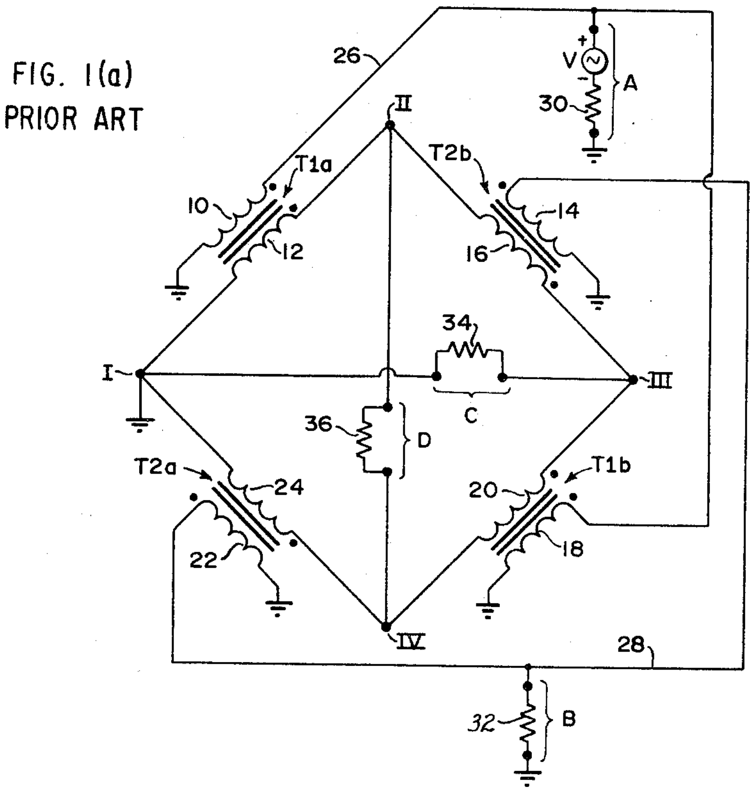
FIG. 1(a) PRIOR ART

Referring to FIGURE 1*a*, I have shown a known low frequency hybrid comprising four transformers labeled T1*a*, T1*b*, T2*a* and T2*b*. For purposes of explanation, these transformers may be considered all to have the same turns ratio, with the winding directions indicated by dots in the conventional manner.

Transformer T1*a* has a primary winding 10 and a secondary winding 12. Transformer T2*b* has a primary winding 14, and a secondary winding 16; transformer T1*b* has a primary winding 18 and a secondary winding 20; and transformer T2*a* has a primary winding 22 and a secondary winding 24.

The primary windings of corresponding transformers are interconnected in accordance with the teachings of the Smith-Vaniz patent cited above. Thus, the T1*a* and T1*b* transformers are interconnected by the wire 26 and by ground. The primary windings of the T2*a* and T2*b* transformers are similarly interconnected by ground and by the wire 28.

As shown, the secondary windings of the T1*a*, T1*b*, T2*a* and T2*b* transformers are interconnected to form a bridge. The bridge terminals are labeled I, II, III and IV. Terminal I is grounded. One port of the hybrid is formed across the terminals III–I, and another port across the terminals II–IV. These ports are labeled C and D, respectively. The other two ports of the hybrids are formed between the wire 26 and ground and between the wire 28 and ground, and these may be termed the A port and the B port, respectively.

As indicated in FIGURE 1*a*, the A port, whose terminals are the wire 26 and ground, is shown having a resistor 30 and a radio frequency voltage source V connected in series with it. The voltage source is shown as having an instantaneous polarity such that the wire 26 is positive with respect to ground, and that polarity will be used in the explanation of the operation of the circuit of FIGURE 1*a*.

The other ports B, C and D are shown terminated in resistors. The resistor 30 in series with the voltage source across the A port and the resistor 32 connected across the B port will be of the same size. The resistors 34 and 36 connected across the C and D ports will be twice the size of the resistors 30 and 32.

If an alternating voltage having the instantaneous polarity shown in FIGURE 1*a* is applied to the primary windings of the transformers T1*a* and T1*b*, and if, as previously described, the transformers have a unity turns ratio, the same voltage will appear across the windings 12 and 20 at the same polarity as on the primary. This means that the terminal II will be positive with respect to ground by an amount +V. The terminal III will be positive with respect to the terminal IV by a similar amount, and the terminal IV is free to float with respect to ground, as is the terminal III. However, from consideration of symmetry, the terminal IV will also assume a zero (or ground) potential, and the terminal III will assume a potential with respect to ground of +V. Thus, no voltage will appear across the winding 24 of the transformer T2*a* and the winding 16 of the transformer T2*b*. Hence no energy will be transmitted to the resistor 32 connected across the terminals of the B port. The voltage at III will be the voltage appearing at the C port and will be +V. Similarly, the voltage at the D port appearing between the terminals II and IV (assuming II to be the "upper") will also be +V. In a similar manner, the effect of exciting the hybrid circuit shown in FIGURE 1*a* with a source having an instantaneous polarity +V connected in series respectively with the resistors 32, 34 and 36 can be determined, and from this it will be apparent that the circuit of FIGURE 1*a* functions as a hybrid circuit. Table I set out below specifies the voltage at each of the terminals I, II, III and IV, and the voltage appearing at each of the ports A, B, C and D, for excitation from each of the other ports.

TABLE I

| Excited port | Terminal voltages | | | | Port voltages | | | |
|---|---|---|---|---|---|---|---|---|
| | I | II | III | IV | A | B | C | D |
| A | 0 | +V | +V | 0 | (*) | 0 | +V | +V |
| B | 0 | 0 | +V | +V | 0 | (*) | +V | −V |
| C | 0 | +V/2 | +V | +V/2 | V/2 | V/2 | (*) | 0 |
| D | 0 | +V/2 | 0 | −V/2 | +V/2 | −V/2 | 0 | (*) |

* Indicates excited port.

Figure 1B:
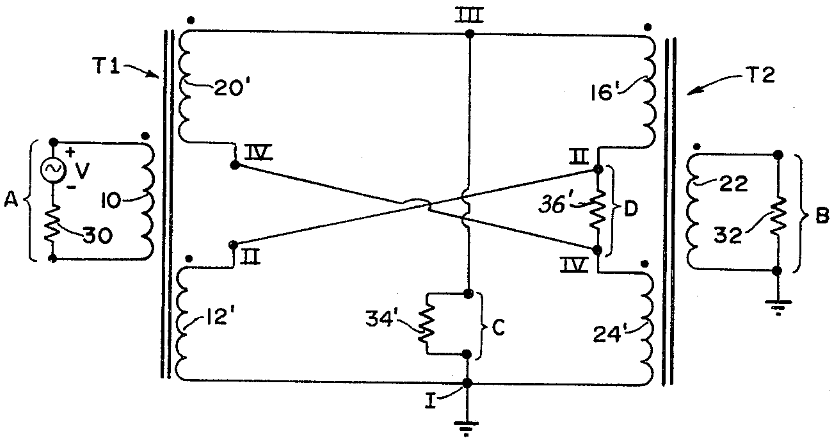
FIG. 1(b) PRIOR ART

It will be apparent from inspection of FIGURE 1*a* that the low frequency hybrid need not use four transformers since two transformers each having a pair of secondary windings could be used to provide the windings 12, 16, 20 and 24. Such a circuit arrangement is shown in FIGURE 1*b*, in which the transformer T1 corresponds to the transformers T1*a* and T1*b* and the transformer T2 corresponds to the transformer T2*a* and T2*b* of FIGURE 1*a*, respectively. The secondary windings corresponding to the windings 16 and 20 in FIGURE 1*a* are shown as 16′ and 20′ in FIGURE 1*b*. In FIGURE 1*b*, the terminals corresponding to the bridge terminals of FIGURE 1*a* have been lettered with corresponding Roman numerals. The circuit of FIGURE 1*b* indeed performs substantially in the manner of FIGURE 1*a*.

In practice, the winding 10 in the circuit of FIGURE 1*b* is preferably wound with additional turns, so that the impedance at the A and B ports of the low frequency hybrid of FIGURE 1*b* is identical to that appearing at the C and D ports. For example, the windings 12′ and 20′ may each be provided with seven turns while the winding 10 is provided with ten turns. Similarly the winding 22 may be provided with ten turns and 16′ and 24′ with seven turns. This is because impedances are transformed by the transformer in accordance with the square of the turns ratio; seven is approximately equal to $$\frac{10}{\sqrt{2}}$$

by the arrangement, the ports can be matched by equal terminating impedances; thus, the resistors 30, 32, 34′ and 36′ would have equal values.

As is apparent from inspection of FIGURE 1*b*, the A, B and C ports may all be connected to ground. However, the D port, which appears between the terminals II and IV cannot be grounded, since the proper operation of the bridge type hybrid requires that these terminals be floating. When unbalanced operation has been required when the circuit of FIGURE 1*b* has heretofore been used, a "balun" which is a device for connecting an unbalanced source or a load to a balanced source or load, has been used. For example, this could be a simple one-to-one transformer, the secondary of which is ungrounded and the primary of which is grounded. However, the addition of a transformer to the circuit of FIGURE 1*b* requires an additional core, and the core increases the circuit loss. Additionally, it substantially increases the circuit expense.

Figure 2:
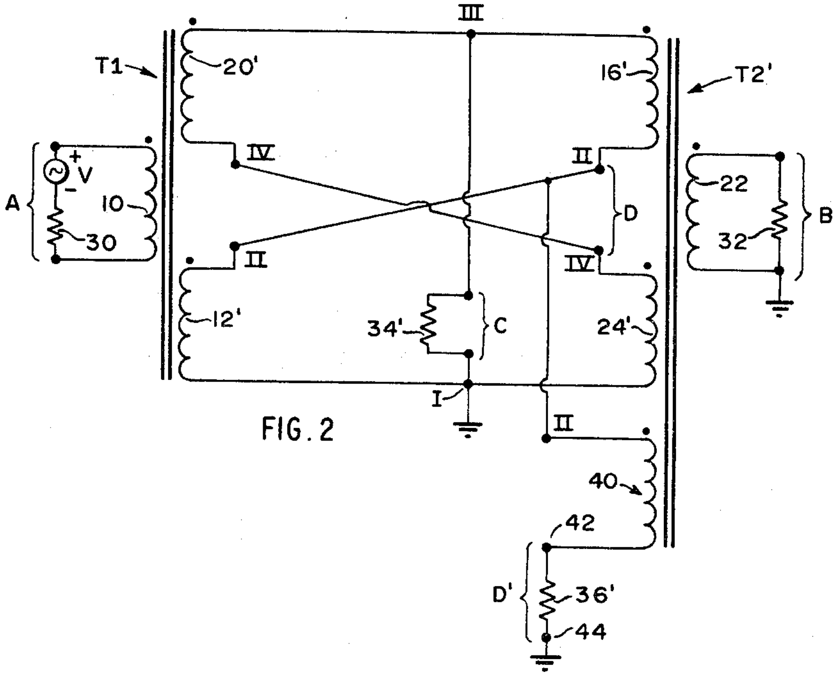
FIGURE 2 is a schematic drawing similar to FIGURE 1*b* showing a low frequency hybrid circuit incorporating the improved construction of my invention.

I have found that the circuit shown in FIGURE 2 will permit all four ports of the hybrid circuit of FIGURE 1*b* to be unbalanced, and yet all that is required is an additional winding on one of the transformers, here shown as a winding 40 on the transformer T2′. The transformer T2′ is otherwise the same as the transformer T2. As shown, one end of the winding 40 may be connected to terminal II, and the other end of the winding 40 may be connected to a terminal 42. Terminal 42 is one of the connection terminals for a port D′, the other terminal 44 being grounded. The port D, between terminals II and IV, is not used. The resistor 36′ used for terminating the port D in FIGURE 1*b* is connected across the port D′ in FIGURE 2; the same voltage appears at the port D′ as at the port D, except that the port D′ is now unbalanced because the terminal 44 is grounded. The turns ratios of the transformers T1 and T2 may be the same as those discussed in connection with FIGURE 1*b*, and the winding 40 may have the same number of turns as the windings such as 12′. Thus, the terminating resistors 30, 32, 34′ and 36′ have equal values, as in FIGURE 1*b*.

The manner in which the winding 40 performs the function indicated may be rather simply verified. From Table I above, which also applies to FIGURE 2, except that when equal terminating impedances are used as discussed above, the voltages in the table would be accordingly scaled, it is apparent that with excitation from the A port with a voltage source having a maximum amplitude V and an instantaneous polarity such as that indicated, there is no net voltage across the windings 16' and 24' of the transformer T2. Therefore no voltage will be induced in primary winding 22 or in winding 40. Accordingly, the voltage existing at the terminal II will be the voltage at terminal 42 with respect to ground. From Table I, this voltage will be +V and this is identical with the port voltage which should exist across the port B is indicated in the Table. For excitation from the port B, the voltage in terminal II will be 0 with respect to ground. A voltage will be induced in winding 40 such that the upper end of the winding 40 will be positive with respect to the lower end; thus, the voltage at the terminal 42 with respect to ground will be —V. This is indeed the voltage that should exist at the port as indicated by Table I. For excitation from the C port, i.e. excitation such that the terminal III of the bridge is positive with respect to ground, the voltage across each of the windings 16' and 24' is $+V/2$; i.e., the upper end of each of the windings is positive with respect to the lower end. The same voltage will appear across the winding 40. The voltage appearing at the terminal II for excitation from the C port is $+V/2$, and therefore the voltage at the terminal 42 with respect to ground will be 0. This is the voltage that should exist at the D' port. Finally, for excitation from the D' port in the same manner, i.e., the terminal 42 is considered to be at a voltage +V with respect to ground, the voltage $+V/2$ will appear at terminal II and the voltage at terminal 42 will divide equally between the winding 40 and the winding 12. However, it will be observed that the terminal II is negative with respect to terminal 42 by an amount $-V/2$, and this value of $-V/2$ appearing across the winding 40 will induce a similar value in the winding 24' and in the winding 22. Thus, terminal IV will have a voltage $-V/2$. Winding 16' will have the same negative voltage $-V/2$ across it, and thus the terminal III will be at a 0 potential.

It will thus be seen that by providing the winding 40 on the transformer T2 of the hybrid circuit of the known low frequency bridge type hybrid circuit of FIGURE 1*b*, it is possible to provide four unbalanced ports with a hybrid using only two cores.

If Table I is examined, it will be observed that if the voltage appearing for any condition of excitation on the terminal II has subtracted from it the voltage appearing on the port B, the resulting voltage is identical to that appearing at the D' port. In effect then the winding 40 subtracts from the voltage appearing at the terminal II the voltage appearing across the B port.

Figure 3:
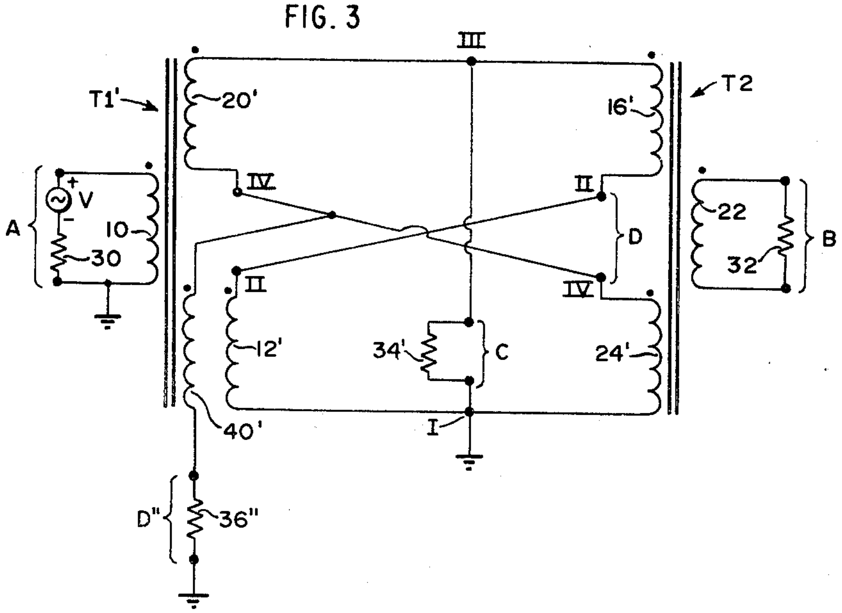
FIGURE 3 is a schematic drawing of a low frequency hybrid circuit in accordance with a modification of my invention.

FIGURE 3 illustrates a construction in which the negative of the voltage appearing at the D port is provided unbalanced with respect to ground. In this instance the voltage appearing at the terminal IV has subtracted from it the voltage appearing across the winding 10 of the transformer T1'. The resulting voltage is the exact inverse of that appearing at the D port. Thus when the port A is excited the voltage appearing at the D port is +V while that appearing at the D'' port shown in FIGURE 3 would be —V. Similarly, when the D port is excited the voltage appearing at the D port is —V while that appearing at the D'' port would be +V. Thus, by the addition of the simple winding to one of the two transformers the voltages identical to those appearing across one set of diagonals of the bridge are provided with respect to ground but by connecting to the other ungrounded diagonal terminal and putting the winding on the other transformer the inverse of these voltages are provided. With some applications, it may be desired both to provide the signal and its inverse in which case of course the terminating resistors for the ports D' and D'' are provided.

Thus I have provided a simple low frequency hybrid circuit of the bridge type in which all ports are unbalanced with respect to ground and in which the two cores are used, thus substantially reducing both the loss in such circuit due to core loss also reducing the cost of such circuits.

It will thus be seen that the objects set forth above among those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

Having described my invention, what I claim as new and desire to secure by Letters Patent is:

1. In a low frequency hybrid circuit which includes a first and a second magnetic core transformer, each transformer having a primary and two secondary windings, the four secondary windings being interconnected to form a bridge, a first two of the ports of said hybrid circuit being across the primary windings of said transformers and the other two ports of said hybrid appearing across the diagonals of said bridge formed by said secondary windings, one end of each of said primary windings being grounded and one of the terminals of said bridge being grounded to thereby form three unbalanced ports, the improvement which consists of providing a fourth unbalanced port, said fourth unbalanced port being provided between ground and one end of a third secondary winding on one of said transformers, the other end of said third secondary winding being connected to one of the diagonal terminals of said bridge which forms one terminal of said unbalanced port.

2. A hybrid circuit, comprising first and second transformers, said first transformer having a primary winding and first and second secondary windings, said second transformer having a primary winding and third, fourth and fifth secondary windings, said secondary windings on said first transformer being connected in series with the third and fourth secondary windings on said second transformer in the order first, third, second, fourth, first, with said first and second secondary windings being in phase opposition, and with said third and fourth secondary windings being in series opposition, said fifth secondary winding being connected in series with a first matching impedance between a reference terminal at the junction of said first and fourth secondary windings and the junction of said first and third secondary windings, a second matching impedance connected between said reference terminal and the junction of said second and third secondary windings, one terminal of each primary winding being connected to said reference terminal, a third matching impedance connected across the primary winding of said first transformer, and a fourth matching impedance connected across the primary winding of said second transformer.

References Cited

UNITED STATES PATENTS

| | | | |
|---|---|---|---|
| 3,181,087 | 4/1965 | Almering | 333—11 |
| 3,426,298 | 2/1969 | Sontheimer et al. | 333—11 X |

HERMAN KARL SAALBACH, Primary Examiner

PAUL L. GENSLER, Assistant Examiner

U.S. Cl. X.R.

177—81; 333—25